United States Patent Office 3,345,409
Patented Oct. 3, 1967

3,345,409
A METHOD OF PREPARING 1,3,10,11,12-PENTA-HYDROXYNAPHTHACENE-2-CARBOXAMIDES
Jerry Robert Daniel McCormick, Spring Valley, N.Y., assignor to American Cyanamid Company, Stamford, Conn., a corporation of Maine
No Drawing. Filed Dec. 16, 1965, Ser. No. 514,367
10 Claims. (Cl. 260—559)

ABSTRACT OF THE DISCLOSURE

This disclosure describes a process for converting 5-hydroxyanhydrotetracyclines to the corresponding 1,3,10,11,12-pentahydroxynaphthacene - 2 - carboxamides by means of hydriodic acid.

---

This invention relates to a new process for producing 1,3,10,11,12-pentahydroxynaphthacene - 2 - carboxamides and, more particularly, is concerned with a novel process for converting 5-hydroxyanhydrotetracycline and its derivatives to the corresponding 1,3,10,11,12-pentahydroxynaphthacene-2-carboxamides as set forth in the following reaction scheme:

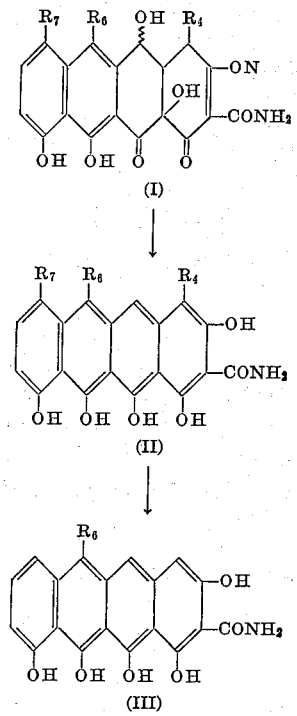

wherein $R_4$ is hydrogen or dimethylamino, $R_6$ is hydrogen or methyl and $R_7$ is hydrogen, fluorine, chlorine or bromine.

The conversion of the 5-hydroxyanhydrotetracyclines (I) to the corresponding 1,3,10,11,12 - pentahydroxynaphthacene-2-carboxamides (II) is accomplished by treating an appropriately substituted 5-hydroxyanhydrotetracycline (I) with hydriodic acid at a temperature of from about 80° C. to the refluxing temperature of the hydriodic acid (about 120° C.) for a period of time of from about 1 to about 30 minutes. The conversion of the 1,3,10,11,12 - pentahydroxynaphthacene-2-carboxamides (II) to the corresponding 1,3,10,11,12-pentahydroxynaphthacene-2-carboxamides (III) is accomplished by treating an appropriately substituted 1,3,10,11,12-pentahydroxynaphthacene-2-carboxamide (II) with hydriodic acid at the reflux temperature of the hydriodic acid (about 120° C.) for a period of time of from 15 minutes to about an hour or more. The hydriodic acid can be employed in a solution of any concentration up to about 57% HI although 48% HI is usually employed for reasons of convenience. It is sometimes advantageous to add a small quantity of red phosphorous, hypophosphorous acid, or phosphorous acid to remove the free iodine liberated by the reaction. Reaction resistant co-solvents are useful to speed up the reaction. Examples are phenol and phenol derivatives, aliphatic carboxylic acids, and higher aromatic hydrocarbons (such as xylene, diphenyl, decalin).

Representative 5 - hydroxyanhydrotetracyclines (I) which may be converted by the method of the present invention are, for example, (1) 5β-hydroxyanhydrotetracycline, (2) 7-fluoro-5β-hydroxyanhydrotetracycline, (3) 7 - chloro - 6 - demethyl-5α-hydroxyanhydrotetracycline, and (4) 7 - bromo-6-demethyl-5α-hydroxyanhydrotetracycline whereby there is obtained (1) 4-dimethylamino-6-methyl - 1,3,10,11,12 - pentahydroxynaphthacene-2-carboxamide, (2) 4-dimethylamino-6-methyl-7-fluoro-1,3,10, 11,12-pentahydroxynaphthacene-2-carboxamide, (3) 4-dimethylamino - 7 - chloro - 1,3,10,11,12 - pentahydroxynaphthacene-2-carboxamide, and (4) 4-dimethylamino-7-bromo-1,3,10,11,12 - pentahydroxynaphthacene-2-carboxamide, respectively. Upon further treatment with hydriodic acid, especially with the use of reaction-resistant co-solvents, as set forth hereinabove, the 4-dimethylamino-6 - methyl - 1,3,10,11,12 - pentahydroxynaphthacene-2-carboxamide and 4-dimethylamino-6-methyl-7-fluoro-1,3, 10,11,12 - pentahydroxynaphthacene-2-carboxamide may be converted to 6-methyl-1,3,10,11,12-pentahydroxynaphthacene - 2 - carboxamide whereas the 4-dimethylamino - 7 - chloro - 1,3,10,11,12 - pentahydroxynaphthacene-2-carboxamide and 4 - dimethylamino-7-bromo-1,3, 10,11,12 - pentahydroxynaphthacene-2-carboxamide may be converted to 1,3,10,11,12-pentahydroxynaphthacene-2-carboxamide.

The 5 - hydroxyanhydrotetracyclines (I), the starting materials for the novel process of the present invention, may be readily prepared from the corresponding 5α-hydroxytetracyclines or 5a,11a-dehydrotetracyclines. Upon treatment of an appropriately substituted 5α-hydroxytetracycline with a strong acid such as conc. hydrochloric acid, conc. hydriodic acid, trifluoroacetic acid, conc. phosphoric acid, etc., at room temperature for a period of time of from about 5 to about 10 minutes there is obtained the corresponding 5α-hydroxyanhydrotetracyline series. Upon treatment of an appropriately substituted 5a,11a-dehydrotetracycline (sometimes known in terms of their tautomers, 5,5a-dehydrotetracyclines) with a strong acid such as conc. hydrochloric acid, conc. hydroiodic acid, conc. phosphoric acid, etc., at room temperature for a period of time of from about 5 to about 10 minutes there is obtained the corresponding 5β-hydroxyanhydrotetracycline series. As may be readily perceived, the preparation of the 1,3,10,11,12 - pentahydroxynaphthacene - 2 - carboxamides (II) may also be accomplished, without isolation of the intermediate 5-hydroxyanhydrotetracyclines (I), by treating an appropriately substituted 5α - hydroxytetracycline or 5a,11a-dehydrotetracycline with hydriodic acid at a temperature of from about 80° C. to the reflux temperature of the hydriodic acid (about 120° C.) for a period of time of from about 1 to about 30 minutes, in which case the anhydro compound is undoubtedly formed as an intermediate but is immediately further reacted without pause.

The 1,3,10,11,12 - pentahydroxynaphthacene-2-carboxamides (II) and 1,3,10,11,12-pentahydroxynaphthacene-2-carboxamides (III), the products of the novel process of the present invention, are useful as intermediates in the synthesis of physiologically active antibiotics of the tetracycline series as is set forth in greater detail in the copending application of McCormick et al., Ser. No. 424,205, filed Jan. 8, 1965.

The invention will be more particularly illustrated by means of the following specific examples.

EXAMPLE 1

*Conversion of oxytetracycline to 4 - dimethylamino-6-methyl - 1,3,10,11,12 - pentahydroxynaphthacene-2-carboxamide*

A suspension of 100 grams of 5α-hydroxytetracycline hydrochloride in 2 liters of colorless concentrated hydriodic acid was prepared. The mixture was heated to reflux. After about 1 minute at reflux a heavy crystalline precipitate appeared. This precipitate was collected on a filter, washed with water, methanol, acetone, acetonitrile, acetic acid, tetrahydrofuran and ether and then dried. This process gave an 80% yield of the orange crystalline product, 4 - dimethylamino-6-methyl-1,3,10,11,12-pentahydroxynaphthacene-2-carboxamide.

EXAMPLE 2

*Conversion of 4 - dimethylamino-6-methyl-1,3,10,11,12-pentahydroxynaphthacene-2-carboxamide to 6-methyl-1,3,10,11,12-pentahydroxynaphthacene-2-carboxamide*

A mixture of 500 milligrams of 4-dimethylamino-6-methyl - 1,3,10,11,12 - pentahydroxynaphthacene-2-carboxamide (obtained as described in Example 1) and 15 milliliters of p-chlorophenol containing 55% hydriodic acid which was decolorized with potassium hypophosphite, was heated to reflux (about 120° C.) for about 30 minutes. The precipitate which formed was filtered and washed with water, methanol, acetone and ether and then dried. This process yielded 235 milligrams of 6-methyl-1,3,10,11,12-pentahydroxynaphthacene-2-carboxamide as substantiated by infrared and ultraviolet spectral examination.

EXAMPLE 3

*Preparation of 7-chloro-4-dimethylamino-6-methyl-1,3,10, 11,12 - pentahydroxynaphthacene - 2-carboxamide from 7-chloro-5a,11a-dehydrotetracycline*

One gram of 7-chloro-5a,11a-dehydrotetracycline was refluxed with a mixture of 5 milliliters of 55% hydriodic acid and 200 milligrams of potassium hypophosphite for about 10 minutes. The precipitate which formed was filtered, washed with water, methanol, acetone and ether and was then dried. The yield was 238 milligrams of 7-chloro - 4 - dimethylamino-6-methyl-1,3,10,11,12-pentahydroxynaphthacene-2-carboxamide substantiated by infrared and ultraviolet spectral examination.

EXAMPLE 4

*Conversion of 7-chloro-4-dimethylamino-6-methyl-1,3,10, 11,12 - pentahydroxynaphthacene-2-carboxamide to 6-methyl - 1,3,10,11,12 - pentahydroxynaphthacene-2-carboxamide*

One gram of 7-chloro-4-dimethylamino-6-methyl-1,3, 10,11,12 - pentahydroxynaphthacene-2-carboxamide (prepared as described in Example 3) was suspended in a mixture of 20 milliliters of p-chlorophenol, 10 milliliters of 55% hydriodic acid and 200 milligrams of potassium hypophosphite. This mixture was refluxed for 2 hours and then filtered while hot. The filtrate was allowed to stand at room temperature until maximum crystallization occurred. The crystalline product was filtered, washed with water, methanol, acetone and ether and then dried. The yield was 560 milligrams of 6-methyl-1,3,10,11,12-pentahydroxynaphthacene-2-carboxamide substantiated by infrared and ultraviolet spectral examination.

EXAMPLE 5

*Preparation of 5β-hydroxyanhydrotetracycline*

A portion of 7-chloro-5a,11a-dehydrotetracycline was mixed with 2-normal sulfuric acid on a rotary shaker. The resulting mixture was filtered and then precipitate was washed with ether and water and then dried to yield 7-chloro-5β-hydroxyanhydrotetracycline.

A 10.49-milligram portion of this 7-chloro-5β-hydroxyanhydrotetracycline was mixed with 10 milliters of cellosolve and 0.02 milliliter of triethylamine on a magnetic stirrer. The mixture was filtered. A 5-milliliter portion of the filtrate was added to a test tube containing 1.2 milligams of 10% palladium on carbon. Reduction was carried out on a Parr shaker using 15 lbs. of hydrogen pressure for 30 minutes. During this period there was reduction of 4 lbs. of hydrogen pressure. The product recovered was 5β-hydroxyanhydrotetracycline as verified by paper chromatography. The product was differentiated from 5α-hydroxyanhydrotetracycline by paper chromatography and by the reaction rate of its conversion to apoterramycine.

EXAMPLE 6

*Conversion of 5β-hydroxyanhydrotetracycline to 4-dimethylamino - 6 - methyl - 1,3,10,11,12-pentahydroxynaphthacene-2-carboxamide*

A 1.0 gram portion of 5β-hydroxyanhydrotetracycline, prepared as described in Example 5, was suspended in 20 ml. of hydriodic acid. The mixture was heated to 100° C. for 10 minutes. The crystalline precipitate which formed was collected on a filter, washed with water, methanol, acetone, acetonitrile, acetic acid, tetrahydrofuran and ether and then dried. This procedure gave an 80% yield of the orange crystalline product, 4-dimethylamino-6-methyl - 1,3,10,11,12-pentahydroxynaphthacene-2-carboxamide.

EXAMPLE 7

*Conversion of 4-dedimethylamino-oxytetracycline to 6-methyl - 1,3,10,11,12-pentahydroxynaphthacene-2-carboxamide*

The process of Example 1 was carried out using 100 g. of 4-dedimethylamino-oxytetracycline in place of oxytetracycline hydrochloride. The product after 5 minutes at reflux was 6-methyl-1,3,10,11,12-pentahydroxynaphthacene-2-carboxamide isolated in 44% yield.

What is claimed is:
1. The method of preparing compounds of the formula:

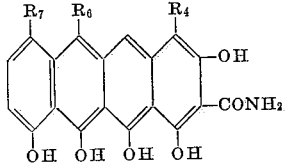

wherein $R_4$ is selected from the group consisting of hydrogen and dimethylamino, $R_6$ is selected from the group consisting of hydrogen and methyl and $R_7$ is selected from the group consisting of hydrogen, fluorine, chlorine and bromine, which comprises treating a compound of the formula:

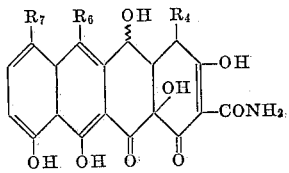

wherein $R_4$, $R_6$ and $R_7$ are as hereinabove defined, with hydriodic acid at a temperature of from about 80° C. to about 120° C. for a period of time of from about 1 to about 30 minutes.

2. The method of preparing compounds of the formula:

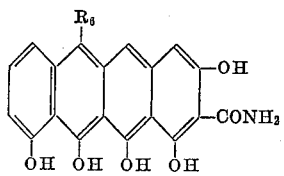

wherein $R_6$ is selected from the group consisting of hydrogen and methyl which comprises treating a compound of the formula:

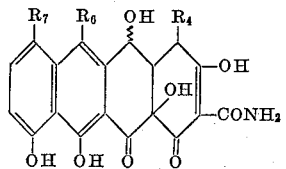

wherein $R_6$ is as hereinabove defined, $R_4$ is selected from the group consisting of hydrogen and dimethylamino and $R_7$ is selected from the group consisting of hydrogen, fluorine, chlorine and bromine, with hydriodic acid at a temperature of about 120° C. for a peroid of time of from about 15 minutes to about 1 hour.

3. The method of preparing compounds of the formula:

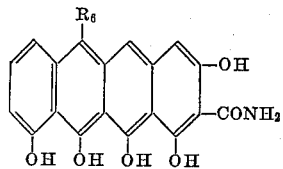

wherein $R_6$ is selected from the group consisting of hydrogen and methyl which comprises treating a compound of the formula:

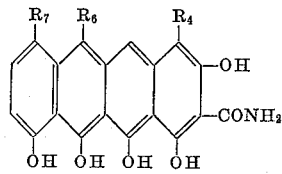

wherein $R_6$ is as hereinabove defined, $R_4$ is selected from the group consisting of hydrogen and dimethylamino and $R_7$ is selected from the group consisting of hydrogen, fluorine, chlorine and bromine, with hydriodic acid at a temperature of about 120° C. for a period of time of from about 15 minutes to about 1 hour.

4. A process according to claim 1 wherein the starting material is 5β-hydroxyanhydrotetracycline.

5. A process according to claim 1 wherein the starting material is 7-fluoro-5β-hydroxyanhydrotetracycline.

6. A process according to claim 1 wherein the starting material is 7-chloro-5α-hydroxyanhydrotetracycline.

7. A process according to claim 1 wherein the starting material is 7-bromo-5α-hydroxyanhydrotetracycline.

8. A process according to claim 2 wherein the starting material is 6-demethyl-5β-hydroxyanhydrotetracycline.

9. A process according to claim 2 wherein the starting material is 6-demethyl-5α-hydroxyanhydrotetracycline.

10. A process according to claim 3 wherein the starting material is 7-chloro-6-methyl-4-dimethylamino-1,3,10,11,12-pentahydroxynaphthacene-2-carboxamide.

References Cited
UNITED STATES PATENTS 2,951,082  8/1960  Sprague et al. _____ 260—328
3,019,260  1/1962  McCormick et al. _____ 260—559

NICHOLAS S. RIZZO, *Primary Examiner.*